(12) United States Patent
Mauffrey et al.

(10) Patent No.: US 11,548,420 B2
(45) Date of Patent: Jan. 10, 2023

(54) SEAT UPHOLSTERY SYSTEM (71) Applicant: FAURECIA Sièges d'Automobile, Nanterre (FR)

(72) Inventors: Jean-Marie Mauffrey, Champagney (FR); Fabrice Etienne, Bavilliers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/319,618

(22) Filed: May 13, 2021

(65) Prior Publication Data
US 2021/0354606 A1 Nov. 18, 2021

(30) Foreign Application Priority Data
May 14, 2020 (FR) ...................... 20 04771

(51) Int. Cl.
*B60N 2/58* (2006.01)
*B60N 2/64* (2006.01)

(52) U.S. Cl.
CPC ......... *B60N 2/5825* (2013.01); *B60N 2/5891* (2013.01); *B60N 2/64* (2013.01)

(58) Field of Classification Search
CPC ...... B60N 2/5825; B60N 2/5891; B60N 2/64; B60N 2/5816; B60N 2/5841
USPC .................................................. 297/452.59
See application file for complete search history.

(56) References Cited

U.S. PATENT DOCUMENTS

| 8,099,837 | B2 | 1/2012 | Santin | |
| 9,834,431 | B2* | 12/2017 | Agonia | B68G 7/12 |
| 10,744,916 | B2* | 8/2020 | Agonia | F16B 21/073 |
| 2003/0215601 | A1* | 11/2003 | Pedde | B60N 2/5825 428/102 |
| 2008/0258523 | A1* | 10/2008 | Santin | B60N 2/5825 29/428 |
| 2009/0064471 | A1* | 3/2009 | Santin | B60N 2/6027 24/581.11 |
| 2009/0165526 | A1 | 7/2009 | Frattini | |
| 2012/0110797 | A1* | 5/2012 | Santin | B60N 2/5825 24/457 |
| 2012/0174352 | A1 | 7/2012 | Tsunoda | |
| 2021/0354606 | A1* | 11/2021 | Mauffrey | B60N 2/5825 |

FOREIGN PATENT DOCUMENTS

DE 102020104233 * 2/2021

OTHER PUBLICATIONS

French Search Report for French App. No. FR20 04771 dated Feb. 24, 2021, BET210062 FR, 8 pages.

* cited by examiner

*Primary Examiner* — Mark R Wendell
(74) *Attorney, Agent, or Firm* — Barnes & Thornburg LLP (57) ABSTRACT

The present disclosure relates to an upholstery system for a vehicle seat, comprising: a foam lining comprising a front face and a rear face, a flexible covering which covers the front face of the foam lining, a rigid part which covers the rear face of the foam lining, at least one series of attachment systems, which are received as inserts in the foam lining, the attachment systems of the series being interconnected by at least one ball joint, and wherein the attachment systems are configured to ensure the attachment of the covering and of the rigid part onto the foam lining.

20 Claims, 6 Drawing Sheets

SEAT UPHOLSTERY SYSTEM

PRIORITY CLAIM

This application claims priority to French Patent Application No. FR20 04771, filed May 14, 2020, which is expressly incorporated by reference herein.

BACKGROUND

The present disclosure relates to a seat upholstery system, in particular for a motor vehicle, as well as to a seat comprising such an upholstery system. The present disclosure also concerns a method for manufacturing such an upholstery system.

SUMMARY

According to the present disclosure, an upholstery system for a vehicle seat comprises:

a foam lining, comprising a front face intended to receive the occupant and a rear face, at least one covering which covers the front face and/or the rear face of the foam lining, at least one series of attachment systems, which are received as inserts in the foam lining, the attachment systems of the series being interconnected by at least one ball joint, and wherein the attachment systems are configured to ensure the attachment of the at least one covering onto the foam lining.

In illustrative embodiments, the at least one covering comprises a flexible covering which covers the front face intended to receive the occupant, and a rigid part which covers the rear face of the foam lining. The attachment systems are configured to ensure the attachment of the flexible covering and of the rigid part onto the foam lining.

In illustrative embodiments, the at least one covering, in particular the rigid part, may comprise a panel which covers the rear face of the foam lining 2.

In illustrative embodiments, the at least one series of attachment systems follows a non-rectilinear path along a contour of the foam lining, the non-rectilinear path being made possible by the at least one ball joint.

In illustrative embodiments, the attachment systems each comprise a body forming an anchoring part embedded in the foam, and a clipping part configured to ensure the attachment of the covering and of the rigid part by means of at least one first clip integral with the covering and at least one second clip integral with the rigid part.

In illustrative embodiments, the covering is made integral with the first clip by a seam and/or the rigid part is made integral to the second clip by a seam.

In illustrative embodiments, the clipping part of each attachment system comprises a concave female attachment part, receiving the at least one first clip and the at least one second clip, both in the form of male parts.

In illustrative embodiments, the female parts of the attachment systems of the series are extended in the form of at least one continuous groove extending along the path of the series of attachment systems, the at least one groove being formed by the alternation of the hollow parts of the female parts of the attachment systems, and at least one groove in the foam lining which extend the hollow sections of the female parts between the bodies of two consecutive attachment systems of the series.

In illustrative embodiments, the foam lining comprises side faces and an upper face which are arranged between the front face and the rear face of the foam lining, the continuous groove extending along the side faces and/or the upper face.

In illustrative embodiments, the anchoring part and the clipping part of each system are composed of a section member.

In illustrative embodiments, the clipping part of the section member forms the female part, of U-shaped cross-section, comprising a first leg, a second leg, and a third leg connecting the first leg and the second leg, the third leg forming the bottom of the female part, the female part of U-shaped cross-section simultaneously receiving a pair consisting of at least one first clip and at least one second clip.

In illustrative embodiments, the section member comprises a hooking rib projecting from the third leg, internal to the U of the cross-section, the hooking rib comprising a base extending from the third leg, terminated by a widened part, together with the base forming a first shoulder facing the first leg and a second shoulder facing the second leg, and the at least one first clip of the pair is locked in the female part of U-shaped cross-section between the first leg and the first shoulder, and the at least one second clip of the pair is locked in the female part between the second leg and the second shoulder.

In particular and for this purpose:

the first clip is a section member integral with the covering, the section member comprising a section comprising a leg inserted along the first leg, terminated by a hook configured to engage with the first shoulder, the second clip is a section member integral with the rigid part, the section member comprising a section comprising a leg inserted along the second leg, terminated by a hook configured to engage with the second shoulder.

In illustrative embodiments, the anchoring part of the section member of each attachment system comprises legs extending transversely and/or rearwards relative to the clipping part of the section member.

In illustrative embodiments, each attachment system comprises, on either side of the body forming the anchoring part and the clipping part, a spherical male portion and an elastically deformable female portion complementary to the spherical male portion, the at least one ball joint being formed by snap-fitting a female portion of an attachment system of the series, with a spherical male portion of a consecutive attachment system of the series.

In illustrative embodiments, this disclosure relates to a motor vehicle seat comprising a seating portion and a backrest, and wherein the backrest comprises an upholstery system according to this disclosure.

In illustrative embodiments, this disclosure relates to a method for manufacturing an upholstery system according to this disclosure, comprising:

the overmolding of the foam lining onto the at least one series of attachment systems which are connected by at least one ball joint, the attachment of the at least one covering (in particular the attachment of the flexible covering and the attachment of the rigid part) to the attachment systems of the series which are received as inserts in the foam lining, for example by snap-fitting.

According to one embodiment of the manufacturing method suitable for obtaining an upholstery system for which the female parts of the attachment systems of the series are extended in the form of at least one continuous groove extending along the path of the series of attachment systems and wherein the overmolding comprises:

positioning the attachment systems of the series in part of a mold of a die, as well as positioning a flexible closure member, forming part of the die, which extends continuously along the female parts of the attachment systems to close them off, closing the mold and injecting a plastic foam so as to obtain a molded product by overmolding the attachment systems with the plastic foam, removing the closure member from the molded product to expose the continuous groove extending along the path of the series of attachment systems.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

For the most part, the drawings and the following description contain elements that are certain in nature. They therefore not only can serve to provide a better understanding of this disclosure, but where appropriate also contribute to its definition.

This disclosure relates to an upholstery system 1 for a vehicle seat, comprising:

a foam lining 2 comprising a front face 20 intended to receive the occupant and a rear face 21, at least one covering 3, 4 which covers the front face 20 and/or the rear face 21 of the foam lining 2, at least one series of attachment systems 5, the attachment systems being received as inserts in the foam lining 2 and being configured to ensure the attachment of the at least one covering 3, 4 onto the foam lining 2, the attachment systems 5 of the series being interconnected by at least one ball joint 6.

According to one embodiment, the at least one covering comprises a flexible covering 3 which covers the front face 20 intended to receive the occupant, and a rigid part 4 which covers the rear face of the foam lining 2. The attachment systems 5 are configured to ensure the attachment of the flexible covering 3 and of the rigid part 4 onto the foam lining.

"Rigid" in "rigid part" is understood to mean that the rigid part 4 covering the rear face 21 is of greater rigidity than that of the flexible covering 3.

The at least one covering, in particular the rigid part, may comprise a panel which covers the rear face of the foam lining.

The foam lining 2 may be a backrest lining of a seat, and in particular of a vehicle seat, in particular of a motor vehicle.

Figure 1:
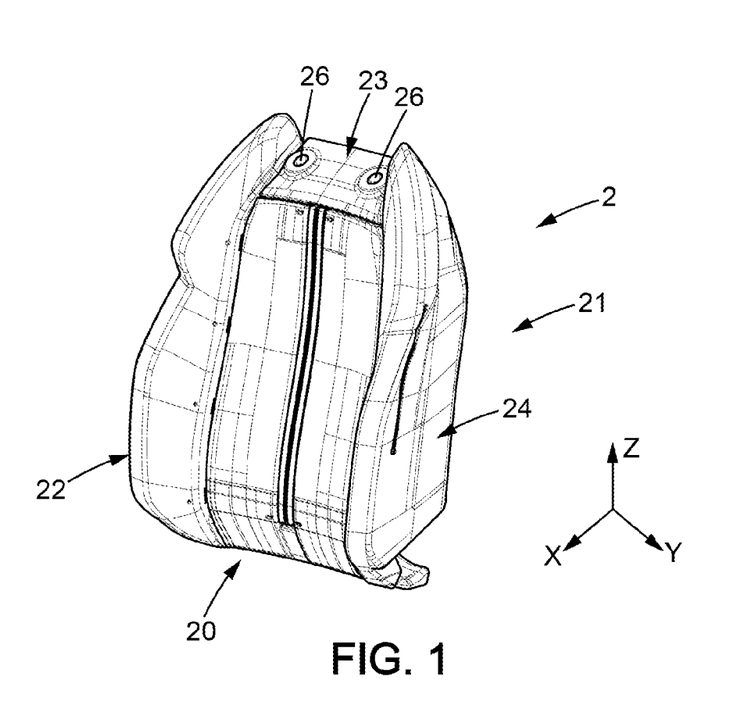
FIG. 1 shows a perspective view of a foam lining of an upholstery system according to this disclosure in one embodiment, in particular a foam lining for a seat backrest.
Figure 2:
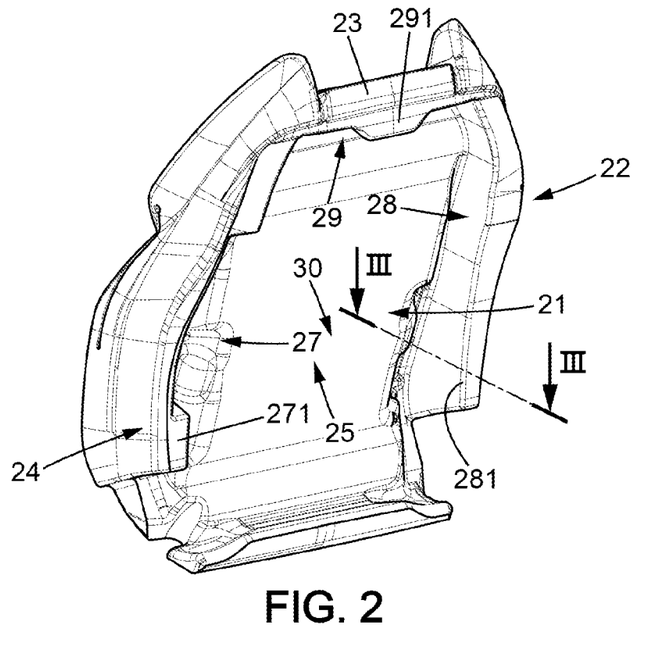
FIG. 2 is a rear perspective view of the foam lining of FIG. 1.

A foam lining is illustrated in perspective in FIG. 1, in a position extending heightwise in the z direction of the xyz orthogonal reference system.

In this orientation, the foam lining of the backrest extends:

in the z direction, from a lower face of the lining up to an upper face 23, in the y direction, transversely, from a (first) side face 22 to a (second) side face 24, in the x direction, in thickness, from the front face 20 intended to receive the user's back, through the flexible covering, to the rear face 21.

The vehicle seat comprises a seating portion (not shown), comprising a seating portion frame and an upholstery system forming a seating cushion, and extending longitudinally in the x direction, from a front edge to a rear edge, in the y direction, transversely, from a (first) side edge and to a (second) side edge, and in the z direction, in thickness.

The geometry of the foam lining 2 is typically obtained by molding. This shape is defined by the mold of the die, and in particular by the internal walls of the mold cavity restricting the expansion of the foam when the mold is closed.

The front face 20 of the foam lining 2 may notably comprise a concave profile in the xy plane so as to provide lateral support for the user in the y direction, as can be seen in the example of FIG. 1.

The rear face 21 may notably comprise a recess intended to receive the frame of the seat backrest Ch. The dimensions of the recess 25 can allow insertion of the backrest frame by slotting it in, as is understandable from the view along the sectional plane parallel to the xy plane, visible in FIG. 5. The frame thus comprises an upright which comes to bear against a side wall 27 extending along the xz plane, inside the recess 25, near side face 24, and another upright which comes to bear against another side wall 28 extending along the xz plane, located opposite in the transverse direction y, near side face 22.

The backrest frame further comprises, in addition to the two uprights each extending in the z direction, a crosspiece extending in the y direction, joining the uprights together at their upper end. This crosspiece is intended to bear against an internal lower wall 29, extending along the xz plane, near the upper face 23.

Furthermore, the frame, including its two uprights and its crosspiece, may bear against the bottom of the recess which extends along the yz plane.

In addition, lips 271, 281 and 291 may respectively be associated with the internal side walls 27, 28 and with the lower wall 29 so as to ensure that the lining is retained on the backrest frame. These lips resist disassembly of the lining during a force in the x direction tending to pull off the lining.

The assembly of the foam lining 2 onto the backrest frame can thus be obtained by inserting the backrest frame via the lower end of the recess, which is open, by sliding the uprights along the side walls 27, 28 in the Z direction, until the crosspiece of the frame abuts against the lower wall 29.

The upper face 23 of the foam lining may comprise two recesses, each extending in the Z direction, provided with guide inserts 26. These guide inserts 26 are intended to enable the mounting of a headrest which comprises a body forming a cushion for the user's head, as well as two substantially parallel rods intended to be inserted into the two inserts 26 provided on the upper face 23 of the foam lining 2.

The upholstery system 1 further comprises a flexible covering 3 which covers the front face 20 of the foam lining 2 intended to receive the user's back. This flexible covering may comprise a textile, leather, or imitation leather, and is applied to the front face of the lining, or even to a part, in particular a major part, of the side faces 22, 24 and of the upper face 23. This flexible covering is preferably applied tensioned, preferably evenly so as to avoid the formation of wrinkles.

The upholstery system further comprises a rigid wall 4, such as a rigid panel, covering the rear surface 21 of the foam lining 2. When the frame Ch of the backrest is received in the recess 25 formed on the rear surface of the foam lining, such a rigid wall covers the recess while hiding the frame Ch of the backrest.

Also notably, the upholstery system comprises the at least one series of attachment systems 5, received as inserts in the foam lining 2. The attachment systems are configured to ensure the attachment of the flexible covering 3 and of the rigid part 4 onto the foam lining, in particular by snap-fitting.

The attachment systems 5 are distributed in one or more series, and following a contour of the foam lining 2. This contour may extend along side face 22, upper face 23, and side face 24 in order to enable attachment of the flexible covering 3 and of the rigid part 4.

Also notably, the attachment systems 5 of a series are interconnected by at least one ball joint 6.

The series of attachment systems 5 thus comprises at least two attachment systems serially connected by a ball joint 6. Of course the series may comprise a greater number of attachment systems 5 serially connected by ball joints 5, for example such as three, four, or even five or more attachment systems 5. In each case, two consecutive attachment systems 5 of the series are connected by a ball joint 6.

The use of a ball joint is advantageous in that it allows appropriate positioning of the attachment systems 5, even when the path along the contour of the foam lining to be followed by the attachment systems of the series is not straight.

For example, the retention of the attachment systems 5 in the foam lining 2 is ensured by the fact that the attachment systems 5 are provided as inserts in the foam lining, anchored to the foam lining.

The foam lining 2 (comprising the inserted attachment systems 5) is typically obtained during molding of the foam lining, by overmolding the foam lining onto the attachment systems 5.

For example, the ball joint or joints 6 make it possible to orient the attachment systems 5 in the foam lining and along a non-rectilinear path. This path can vary according to the three dimensions of space (in x, in y, or in z, with the possibilities of pivoting about these three axes forming the three degrees of freedom of the ball joint). The ball joints 6 can in particular make it possible to provide attachment systems 5 regardless of the contour of the foam lining, as long as the radius of curvature of the path to be followed remains within the adjustment range allowed by the ball joint or joints 6.

At least according to one embodiment, at least one series of attachment systems 5 follows a non-rectilinear path T following a contour of the foam lining 2, the non-rectilinear path being enabled by the at least one ball joint 6, namely the one ball joint in the case of a series of two attachment systems 5, or the ball joints 6 when the attachment systems 5 of the series are greater than or equal to three in number.

This path and the positioning of the attachment systems of the series are advantageously adjusted in the mold of the molding die, before injection of the plastic foam. Such positioning in the die makes it possible to position the attachment systems of the series as close as possible to a contour of the foam lining obtained during molding, and according to a desired path.

The series of attachment systems 5 with ball joint is further advantageous in that it allows attachment of the flexible covering and of the rigid part, independently of any particular shape of foam lining.

The positioning of the attachment systems in the mold of the die makes it possible, via the different paths enabled by the ball joint or joints, to adapt the positioning of the attachment systems, and according to a path of the attachment systems 5 of the series that is suitable for the particular shape of the foam lining.

Thus, the series of attachment systems with ball joint(s) 6 represents a universal attachment solution in that it is not dependent on a particular geometry of foam lining, but on the contrary is adaptable to a large number of different geometries of foam lining 2.

This attachment solution can be manufactured inexpensively and quickly, as will be described below.

According to one embodiment, the attachment systems 5 each comprise a body 7 forming an anchoring part 70 embedded in the foam, and a clipping part 71 configured to ensure the attachment of the covering and of the rigid part by means of at least one first clip 30 integral with the covering 3 and at least one second clip 40 integral with the rigid part 4.

The at least one first clip 30 of the flexible covering 3 and the at least one second clip 40 of the rigid part are independent, to enable attachment of the rigid part (or of the flexible covering), prior to attachment of the flexible covering 3.

According to one embodiment, the body 7 of each attachment system, including its anchoring part 70 and its clipping part 71, may be a section member.

Figure 3:
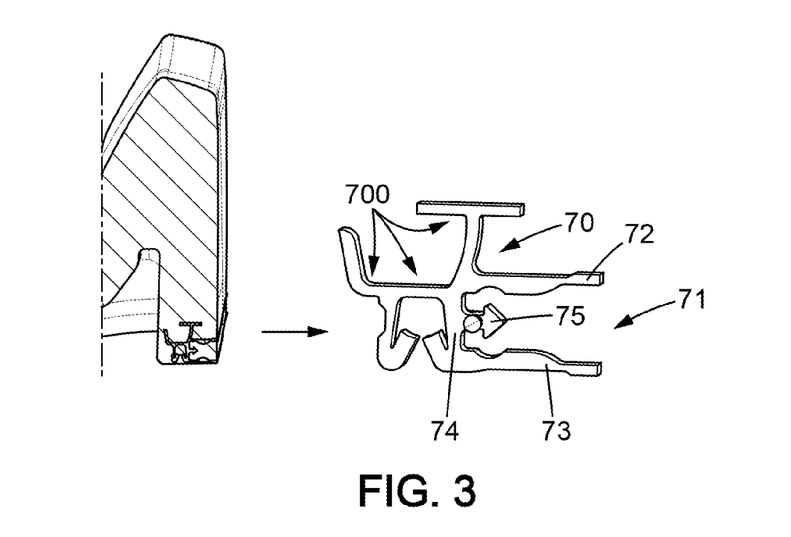
FIG. 3 is a view along line III-III as illustrated in FIG. 2, showing the cross-section of an attachment system inserted in the foam lining, as well as an enlarged detail view of the attachment system.

The attachment systems 5 are received as inserts in the foam lining 2, for example as can be seen in FIG. 3, and so as not to be visible once the covering 3 and the rigid part 4 are attached to the attachment systems 5, in particular by snap-fitting.

According to one embodiment, the flexible covering 3 is made integral with the first clip 30 by a seam 31 and/or the rigid part 4 is made integral with the second clip 40 by a seam 41.

The first clip 30 and/or the second clip 40 may each be a section member. The first clip 30 and the second clip 40 may be formed respectively by a first section member and a second section member.

Figure 5:
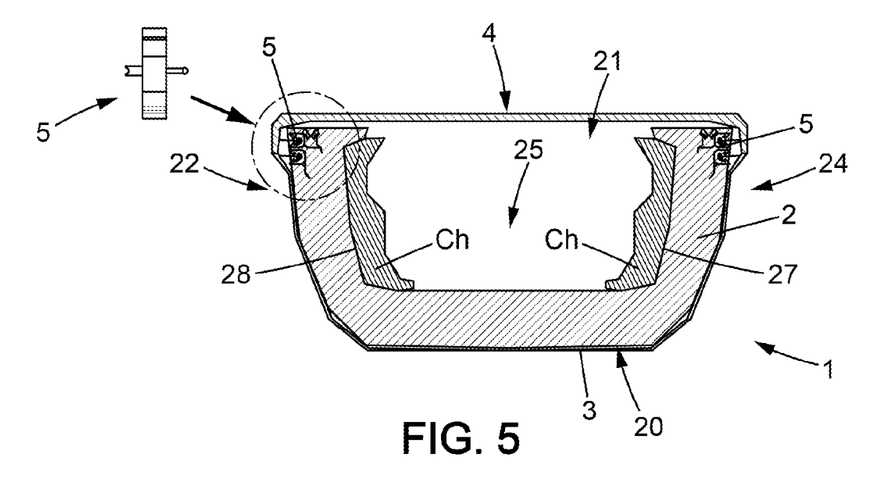
FIG. 5 is a cross-sectional view of the upholstery system, showing the foam lining as well as the flexible covering which covers the front face of the foam lining, the rigid part which covers the rear face of the foam lining, the flexible covering and the rigid part both being attached by snap-fitting to the attachment systems received as inserts in the foam lining.

According to one embodiment, the clipping part 71 of each attachment system 5 comprises a concave female attachment part, receiving the at least one first clip 30 and the at least one second clip 40, both in the form of male parts. The female part of the clipping part may comprise two distinct hollow parts of U-shaped cross-section, including a first hollow part associated with the first clip 30 and a second hollow part associated with the second clip 40 as schematically illustrated in FIG. 5.

Figure 6:
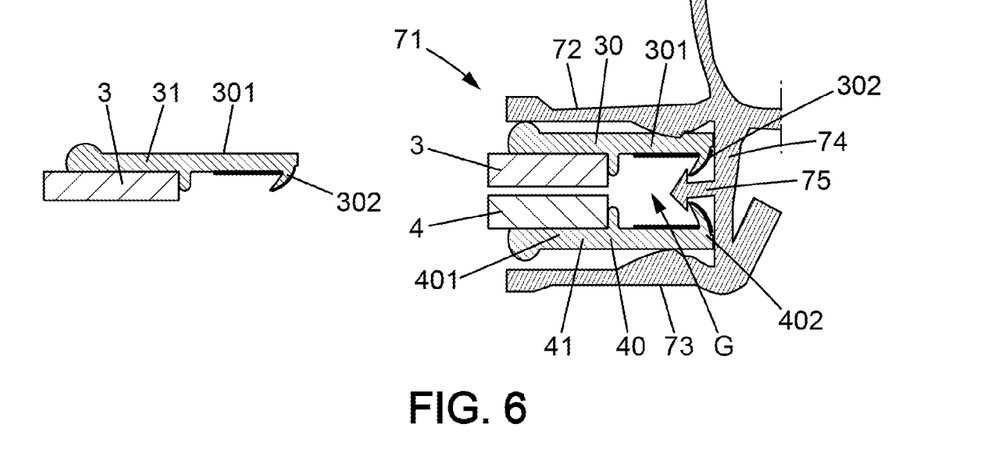
FIG. 6 is a detail view of the clipping part of the attachment system received as an insert in the foam lining, in the form of a female part of U-shaped cross-section, receiving a pair of clips consisting of a first clip integral with the covering, and a second clip integral with the rigid part.
Figure 7:
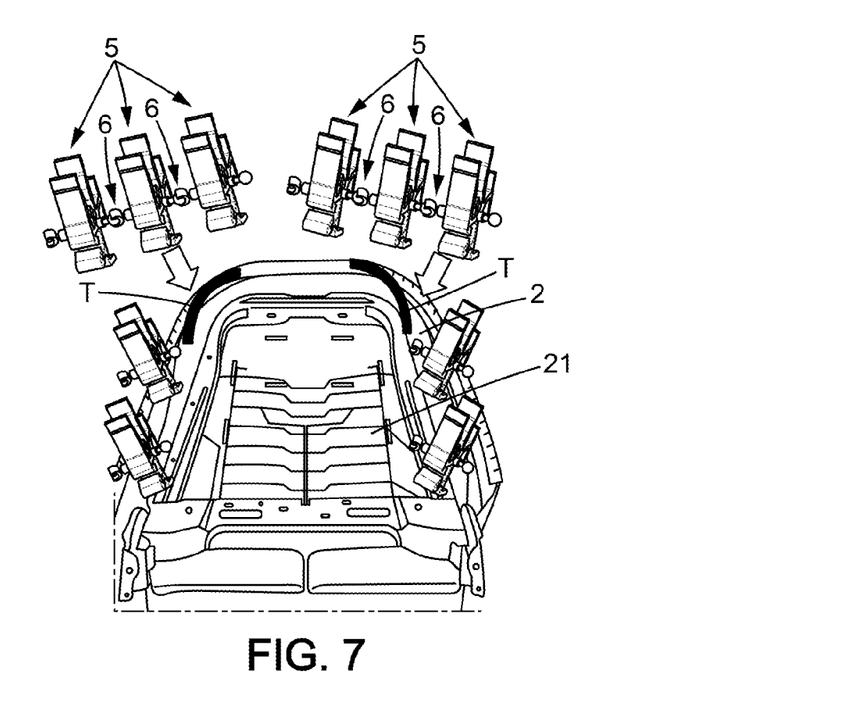
FIG. 7 is a rear view of an automobile seat backrest, including its backrest frame, made of metal, as well as a foam lining of a system according to this disclosure, applied to the frame prior to assembly of the flexible covering and rigid part.

Alternatively, and as can be seen in FIG. 6, the two clips, first clip 30 and second clip 40, may be received simultaneously in a same hollow part of U-shaped cross-section, and as will be described in detail below.

When the attachment systems 5 are inserted into the foam lining 2, the female parts of the attachment systems 5 of the series are extended in the form of at least one continuous groove G extending along the path T of the series of attachment systems 5. This groove G is formed by the alternation of the hollow parts of the female parts of the attachment systems 5, and at least one groove in the foam lining. This foam groove extends the hollow sections of the female parts between the bodies 7 of two consecutive attachment systems of the series. This continuous groove is left free of foam during molding, by the addition of a closure member 10 which prevents foam from filling the hollow sections of the female parts as well as the area forming the intermediate groove between the bodies 7 of the attachment systems 5. This closure member 10 is removed after molding.

When the foam lining 2 comprises side faces 22, 24 as well as an upper face 23 between the front face 20 and rear face 21 of the foam lining 2, the continuous groove G may extend the along the side faces 22, 24 and the upper face 23. This groove opens outwards with respect to the foam lining 2.

The anchoring part 70 and the clipping part 71 of the body 7 of each attachment system 5 thus may be composed of a section member.

According to one embodiment, particularly visible in FIG. 6, the clipping part 71 of the section member forms the female part of U-shaped cross-section, comprising a first leg 72, a second leg 73, and a third leg 74 connecting the first leg and second leg, the third leg 74 forming the bottom of the female part of U-shaped cross-section. The female part of U-shaped cross-section simultaneously receives a pair consisting of at least one first clip 30 and at least one second clip 40.

More particularly, and as can be seen for informational purposes in FIG. 6, the section member may comprise a hooking rib 75 projecting from the third leg 74. This hooking rib 75 comprises a base extending from the third leg 74 and terminated by a widened distal part which is internal to the U of the cross-section. This hooking rib is internal to the U of the cross-section, positioned substantially at the bottom of the U.

This widened part forms, together with the base of the hooking rib 75, a first shoulder facing the first leg 72 and a second shoulder facing the second leg 73. The at least one first clip 30 of the pair comes to be locked in the female U-shaped part between the first leg 72 and the first shoulder, and the at least one second clip 40 of the pair comes to be locked in the female part between the second leg 73 and the second shoulder.

For this purpose, the first clip 30 may be a section member integral with the covering, the section member comprising a section comprising a leg 301, inserted into the female part of U-shaped cross-section, in parallel along the first leg 72, the leg 301 being terminated by a hook 302 configured to engage with the first shoulder. Similarly, the second clip 40 is a section member integral with the rigid part, the section member comprising a section comprising a leg 401 inserted into the female part of U-shaped cross-section, in parallel along the second leg 73, the leg 401 being terminated by a hook 402 configured to engage with the second shoulder.

When inserted into the female part of U-shaped cross-section, the hook 302 of the first clip 30 elastically deforms, at the bottom of the U-shaped cross-section, against the widened part of the hooking rib 75, before returning to position while hooking the (first) shoulder formed between the base of the hooking rib 75 and the widened part, facing the first leg 72.

Similarly, when inserted into the female part of U-shaped cross-section, the hook 402 of the second clip 40 elastically deforms, at the bottom of the U-shaped cross-section, against the widened part of the hooking rib 75, before returning to position while hooking the (second) shoulder formed between the base of the hooking rib 75 and the widened part, facing the second leg 73.

One will also note that the enlarged part at the distal end of the hooking rib 75 has a triangular-shaped cross-section, in particular an isosceles triangle. The base connects the third leg 74 to one of the sides of the triangle, at its middle. The other two same-length sides of the isosceles triangle form two ramps, respectively facilitating the guiding of the hooks 302, 402 during insertion of the first clip 30 and second clip 40.

During manufacture by molding, this hooking rib 75 may also make it possible to ensure that the closure member 10 is held in place in the die mold, as will be described below.

According to one embodiment, the anchoring part 70 of the section member of each attachment system comprises legs 700 extending transversely and/or rearward with respect to the clipping part 71 of the section member. The function of these legs 700 is to increase the useful surface area of the section member engaged with the foam. This reduces localized stresses, and thus the risk of tearing.

According to one embodiment, each attachment system 5 comprises, on either side of the body 7 forming the anchoring part 70 and the clipping part 71, a spherical male portion 8, and an elastically deformable female portion 9 complementary to the spherical male portion.

The at least one ball joint 6 is then formed by snap-fitting a female portion 9 of an attachment system 5 of the series, with a spherical male portion 8 of a consecutive attachment system 5 of the series. The three degrees of freedom of the ball joint 6 are enabled by the ability of the female portion 9 to pivot around the spherical male portion 8, according to three degrees of freedom in pivoting.

Note that the female portion 9 and the male portion 8 may extend along the same axis, oriented in the direction of the section member forming the body 7 of the attachment system 5. For example, the female portion 8 and the male portion 9 may extend the hooking rib 75, on either side of the body 7, along the axis of the hooking rib 75.

Each attachment system 5, including the body 7 forming a section member in particular, and its female portion 9 and male portion 8, may be formed as one element in a single piece, for example obtained by molding a material such as plastic.

For example, the attachment system 5 comprising the body 7 forming a section member in particular, its female portion 9, and its male portion 8, may be obtained by injection molding techniques.

Figure 4:
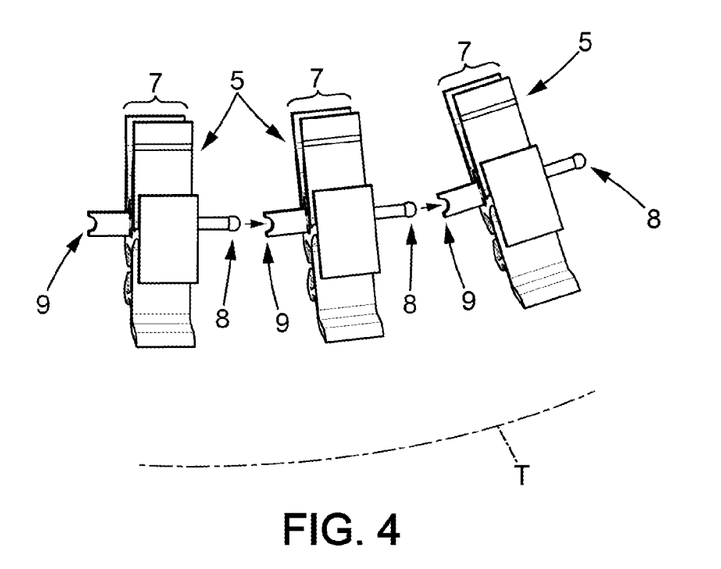
FIG. 4 is a view of a series of three attachment systems, just before their assembly by snap-fitting the spherical male portion of one attachment system into the complementary and elastically deformable female portion of a consecutive attachment system in the series.

The series of attachment systems is then obtained by assembling the different attachment systems 5 together, by snap-fitting a female portion 9 onto the male portion 8 of a consecutive attachment system of the series, and as can be seen in FIG. 4.

This disclosure also relates to a seat, in particular for a vehicle, comprising an upholstery system 1 according to this disclosure.

The upholstery system may in particular be an upholstery system for a backrest. Once the foam lining has been assembled to the frame Ch of the backrest, for example, by slotting the backrest frame into the recess 25, the flexible covering 3 is put in place so that this covering covers the front face 20 of the foam lining, or even at least partly the side faces 22, 24 or even the upper face 23, then this covering is attached, in particular by snap-fitting to the attachment systems received as inserts in the foam lining.

The rigid part 4 is also put in place, and is attached, in particular by snap-fitting to the attachment systems 5 received as inserts in the foam lining.

The at least one first clip 30 of the flexible covering 3 and the at least one second clip 40 of the rigid part 4 may be inserted simultaneously into the attachment systems, or one after the other in any order.

The rigid part 4, such as the panel, may form a cover which hides the backrest frame then received between the foam lining 2 and the rigid part 4, in particular received in the recess 25.

This disclosure also relates to a method for manufacturing an upholstery system 1 according to this disclosure, comprising:

the overmolding of the foam lining 2 onto the at least one series of attachment systems 5 which are connected by at least one ball joint 6, the attachment of the at least one covering (where appropriate the flexible covering 3 and the attachment of the rigid part 4) to the attachment systems 5 of the series which are received as inserts in the foam lining 2.

According to one embodiment of the manufacturing method which allows obtaining an upholstery system 1 for which the female parts of the attachment systems 5 of the series are extended in the form of at least one continuous groove G extending along the path of the series of attachment systems and wherein the overmolding process comprises:

positioning the attachment systems 5 of the series in part of a mold of a die, as well as positioning a flexible closure member 10, forming part of the die, which extends continuously along the female parts of the attachment systems 5 of the series to close them off, closing the mold and injecting a plastic foam so as to obtain a molded product by overmolding the attachment systems 5 with the plastic foam, removing the closure member 10 from the molded product to expose the continuous groove G extending along the path of the series of attachment systems 5.

Figure 8:
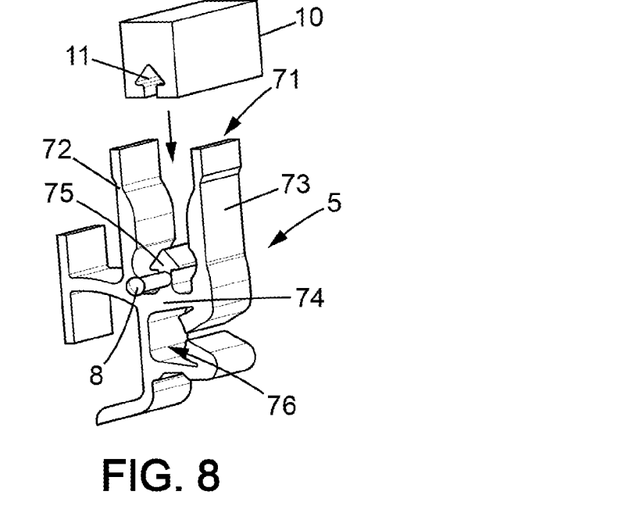
FIG. 8 is a view of the cross-section of a closure member, in the form of a flexible section member, for example of silicone, which closes off the female part of the clipping part of the attachment system during the molding operation, in order to leave this hollow part free of foam.
Figure 9:
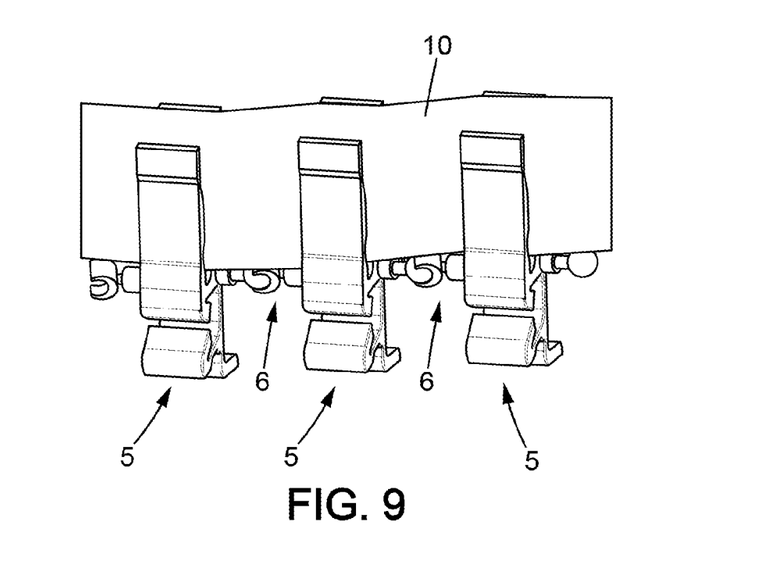
FIG. 9 is a view of the closure member as it extends continuously through the clipping parts of the attachment systems of the series, closing off the U of the cross-sections of the clipping parts.

The closure member 10 is illustrated in FIG. 8, according to one embodiment. It may be a flexible member, for example made of silicone, extending in its longitudinal direction so as to follow the path T of the attachment systems 5. This path T may be non-rectilinear, and vary in the three spatial directions.

The closure member 10 may be of constant cross-section (lengthwise), the cross-section of the closure member being complementary to the female parts of the clipping parts of the attachment systems 8.

According to one embodiment, the cross-section of the closure member 10 is complementary to the U-shaped cross-section defined between the first leg 72, the second leg 3, and the third leg 74.

Retention of the closure member in the U-shaped cross-section may be obtained by a groove 11 of the closure member 10 which hooks on the hooking rib 75 of the attachment system 5.

One will also note that the male spherical portion 8 and the female portion 9 may extend into this groove 11 when the closure member 10 is in place.

Once the product has been molded, the closure member 10 is removed, which exposes the groove formed by the alternation of the U-shaped cross-sections of the clipping parts and of the grooves in the foam lining which extend between the bodies 7 of the attachment systems of the series.

Figure 10:
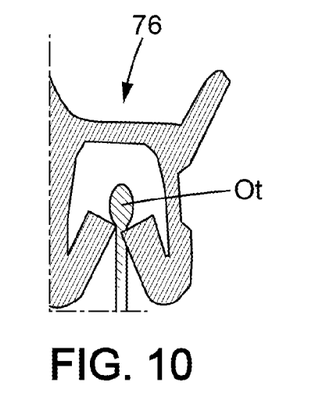
FIG. 10 is a view of a clipping portion of the section member of the attachment system, configured to ensure its positioning and its retention in a mold part of the die, during overmolding operations.

One will also note that the section member forming the body 7 of the system may comprise a part 76, behind the clipping part 71, facilitating the positioning of the attachment system in the mold of the die. This part 76 comprises, as one example, a section of the section member, for example formed between the third leg 74 and another leg. This section of the section member forms a clipping groove intended to receive a male part Ot of the die. This clipping groove has a direction substantially perpendicular to the direction of the U-shaped cross-section of the clipping part 71.

This disclosure relates to the field of seats for motor vehicles. A vehicle may comprise at least one seat intended to accommodate a driver or a passenger of the vehicle, hereinafter referred to as a "user". The seat may be designed to accommodate a single person, or several people seated side by side, and may be arranged in the front or the rear of the vehicle. The seat may also be part of a bench seat that can accommodate several people side by side.

Thus, within the meaning of this disclosure, the term "seat" according to this disclosure denotes a front seat of the vehicle as well as a rear seat of the vehicle. Similarly, this disclosure can be implemented for seats intended for any type of vehicle, and in particular for motor vehicles.

A vehicle seat may comprise a lower frame, configured to be connected to the floor of a vehicle, in particular with means for connecting to the floor of the vehicle, generally in the form of two slides arranged one on either side of the lower frame, each extending along a longitudinal axis of the seat, these being configured to be fixed to the floor of the vehicle and to enable the seat to slide in the longitudinal direction of the seat.

The lower frame may also have a seating portion frame with a front edge and a rear edge, these being interconnected by a first side edge and a second side edge, it being configured to accommodate at least one user.

The lower frame can also have a base, configured to connect the lower frame to the vehicle floor, in particular by means of the connecting means, and positioned at the rear edge of the seating portion frame. The seating portion also comprises a cushion obtained by molding a flexible synthetic foam.

The seat may comprise a backrest frame which may be connected to the seating portion frame by a mechanism enabling its tilt to be adjusted.

The backrest comprises a foam lining, which forms padding, resting on the frame. The foam lining is covered with a flexible covering on the front face intended to receive the back of the user, and a rigid part, such as a panel, which covers the rear face of the lining, hiding the backrest frame.

This disclosure more particularly concerns the upholstery system, comprising a foam lining and coverings, and more particularly, in the case of an upholstery system for a backrest, a flexible covering that covers the front face of the foam lining and a rigid part, such as a panel, that covers the rear face of the foam lining, typically hiding the backrest frame.

The rigid attachment of the panel is typically obtained by fasteners such as clips which attach to the metal frame of the backrest, solely on the straight sections of the frame's section members. The flexible covering can then be attached to the rigid panel, for example by fasteners such as zippers.

This disclosure improves the situation.

An upholstery system for a vehicle seat is proposed, comprising:

a foam lining, comprising a front face intended to receive the occupant and a rear face, at least one covering which covers the front face and/or the rear face of the foam lining, at least one series of attachment systems, which are received as inserts in the foam lining, the attachment systems of the series being interconnected by at least one ball joint, and wherein the attachment systems are configured to ensure the attachment of the at least one covering onto the foam lining.

According to one embodiment, the at least one covering comprises a flexible covering which covers the front face intended to receive the occupant, and a rigid part which covers the rear face of the foam lining. The attachment systems are configured to ensure the attachment of the flexible covering and of the rigid part onto the foam lining.

According to one embodiment, the at least one covering, in particular the rigid part, may comprise a panel which covers the rear face of the foam lining 2.

The features set forth in the following paragraphs may optionally be implemented. They may be implemented independently of one other or in combination with one other:

According to one embodiment, the at least one series of attachment systems follows a non-rectilinear path along a contour of the foam lining, the non-rectilinear path being made possible by the at least one ball joint.

According to one embodiment, the attachment systems each comprise a body forming an anchoring part embedded in the foam, and a clipping part configured to ensure the attachment of the covering and of the rigid part by means of at least one first clip integral with the covering and at least one second clip integral with the rigid part.

According to one embodiment, the covering is made integral with the first clip by a seam and/or the rigid part is made integral to the second clip by a seam.

According to one embodiment, the clipping part of each attachment system comprises a concave female attachment part, receiving the at least one first clip and the at least one second clip, both in the form of male parts.

According to one embodiment, the female parts of the attachment systems of the series are extended in the form of at least one continuous groove extending along the path of the series of attachment systems, the at least one groove being formed by the alternation of the hollow parts of the female parts of the attachment systems, and at least one groove in the foam lining which extend the hollow sections of the female parts between the bodies of two consecutive attachment systems of the series.

According to one embodiment, the foam lining comprises side faces and an upper face which are arranged between the front face and the rear face of the foam lining, the continuous groove extending along the side faces and/or the upper face.

According to one embodiment, the anchoring part and the clipping part of each system are composed of a section member.

According to one embodiment, the clipping part of the section member forms the female part, of U-shaped cross-section, comprising a first leg, a second leg, and a third leg connecting the first leg and the second leg, the third leg forming the bottom of the female part, the female part of U-shaped cross-section simultaneously receiving a pair consisting of at least one first clip and at least one second clip.

According to one embodiment, the section member comprises a hooking rib projecting from the third leg, internal to the U of the cross-section, the hooking rib comprising a base extending from the third leg, terminated by a widened part, together with the base forming a first shoulder facing the first leg and a second shoulder facing the second leg, and the at least one first clip of the pair is locked in the female part of U-shaped cross-section between the first leg and the first shoulder, and the at least one second clip of the pair is locked in the female part between the second leg and the second shoulder.

In particular and for this purpose:

the first clip is a section member integral with the covering, the section member comprising a section comprising a leg inserted along the first leg, terminated by a hook configured to engage with the first shoulder, the second clip is a section member integral with the rigid part, the section member comprising a section comprising a leg inserted along the second leg, terminated by a hook configured to engage with the second shoulder.

According to one embodiment, the anchoring part of the section member of each attachment system comprises legs extending transversely and/or rearwards relative to the clipping part of the section member.

According to one embodiment, each attachment system comprises, on either side of the body forming the anchoring part and the clipping part, a spherical male portion and an elastically deformable female portion complementary to the spherical male portion, the at least one ball joint being formed by snap-fitting a female portion of an attachment system of the series, with a spherical male portion of a consecutive attachment system of the series.

According to a second aspect, this disclosure relates to a motor vehicle seat comprising a seating portion and a backrest, and wherein the backrest comprises an upholstery system according to this disclosure.

According to a third aspect, this disclosure relates to a method for manufacturing an upholstery system according to this disclosure, comprising:

the overmolding of the foam lining onto the at least one series of attachment systems which are connected by at least one ball joint, the attachment of the at least one covering (in particular the attachment of the flexible covering and the attachment of the rigid part) to the attachment systems of the series which are received as inserts in the foam lining, for example by snap-fitting.

According to one embodiment of the manufacturing method suitable for obtaining an upholstery system for which the female parts of the attachment systems of the series are extended in the form of at least one continuous groove extending along the path of the series of attachment systems and wherein the overmolding comprises:

positioning the attachment systems of the series in part of a mold of a die, as well as positioning a flexible closure member, forming part of the die, which extends continuously along the female parts of the attachment systems to close them off, closing the mold and injecting a plastic foam so as to obtain a molded product by overmolding the attachment systems with the plastic foam, removing the closure member from the molded product to expose the continuous groove extending along the path of the series of attachment systems.

This disclosure relates to an upholstery system for a vehicle seat, comprising:

a foam lining comprising a front face and a rear face (21),
a flexible covering which covers the front face of the foam lining (2),
a rigid part which covers the rear face of the foam lining,
at least one series of attachment systems (5), which are received as inserts in the foam lining, the attachment systems (5) of the series being interconnected by at least one ball joint, and wherein the attachment systems are configured to ensure the attachment of the covering and of the rigid part onto the foam lining.

The following numbered clauses include embodiments that are contemplated and non-limiting:

Clause 1. An upholstery system (1) for a vehicle seat, comprising:

a foam lining (2), comprising a front face (20) intended to receive the occupant and a rear face (21),
at least one covering (3,4) which covers the front face (20) and/or the rear face (21) of the foam lining,
at least one series of attachment systems (5), which are received as inserts in the foam lining (2), the attachment systems (5) of the series being interconnected by at least one ball joint (6), and wherein the attachment systems are configured to ensure the attachment of the at least one covering (3, 4).

Clause 2. The upholstery system according to clause 1, wherein the at least one covering comprises a flexible covering (3) which covers the front face (20) intended to receive the occupant, and a rigid part (4) which covers the rear face of the foam lining (2), and wherein the attachment systems are configured to ensure the attachment of the flexible covering (3) and of the rigid part (4) onto the foam lining (2).

Clause 3. The upholstery system according to clause 1 or 2, wherein the at least one covering comprises a panel which covers the rear face (21) of the foam lining (2).

Clause 4. The upholstery system according to clause 1 to 3, wherein the at least one series of attachment systems (5) follows a non-rectilinear path (T) along a contour of the foam lining (2), the non-rectilinear path being made possible by the at least one ball joint (6).

Clause 5. The upholstery system according to clause 2, alone or in combination with clauses 3 or 4, wherein the attachment systems (5) each comprise a body (7) forming an anchoring part (70) embedded in the foam, and a clipping part (71) configured to ensure the attachment of the flexible covering and of the rigid part by means of at least one first clip (30) integral with the flexible covering (3) and at least one second clip (40) integral with the rigid part (4).

Clause 6. The upholstery system according to clause 5, wherein the flexible covering (3) is made integral with the first clip (30) by a seam (31) and/or the rigid part (4) is made integral with the second clip (40) by a seam (41).

Clause 7. The upholstery system according to clause 5 or 6, wherein the clipping part (71) of each attachment system (5) comprises a concave female attachment part, receiving the at least one first clip (30) and the at least one second clip (40), both in the form of male parts.

Clause 8. The upholstery system according to clause 7, wherein the female parts of the attachment systems of the series are extended in the form of at least one continuous groove (G) extending along the path (T) of the series of attachment systems (5), the at least one groove being formed by the alternation of the hollow parts of the female parts of the attachment systems (5), and at least one groove in the foam lining which extend the hollow sections of the female parts between the bodies of two consecutive attachment systems of the series.

Clause 9. The upholstery system according to clause 8, wherein the foam lining (2) comprises side faces (22, 24) and an upper face (23) which are arranged between the front face (20) and rear face (21) of the foam lining (2), the continuous groove (G) extending along the side faces (22, 24) and the upper face (23).

Clause 10. The upholstery system according to clauses 5 to 9, wherein the anchoring part (70) and the clipping part (71) of each system are composed of a section member.

Clause 11. The upholstery system according to clause 10 in combination with one of clauses 7 to 9, wherein the clipping part (71) of the section member forms the female part, of U-shaped cross-section, comprising a first leg (72), a second leg (73), and a third leg (74) connecting the first leg and the second leg, the third leg (74) forming the bottom of the female part, the female part of U-shaped cross-section simultaneously receiving a pair consisting of at least one first clip (30) and at least one second clip (40).

Clause 12. The upholstery system according to clause 11, wherein the section member comprises a hooking rib (75) projecting from the third leg (74), internal to the U of the cross-section, the hooking rib (75) comprising a base extending from the third leg and terminated by a widened part, the widened part forming together with the base a first shoulder facing the first leg and a second shoulder facing the second leg, and wherein the at least one first clip (30) of the pair is locked in the U-shaped female part between the first leg (72) and the first shoulder, and the at least one second clip (40) of the pair is locked in the female part between the second leg (73) and the second shoulder.

Clause 13. The upholstery system according to clause 12, wherein:

the first clip (30) is a section member integral with the covering, the section member comprising a section comprising a leg (301), inserted in parallel along the first leg (72), terminated by a hook (302) configured to engage with the first shoulder, the second clip (40) is a section member integral with the rigid part, the section member comprising a section comprising a leg (401), inserted in parallel along the second leg (73), terminated by a hook (402) configured to engage with the second shoulder.

Clause 14. The upholstery system according to clauses 10 to 13, wherein the anchoring part (70) of the section member of each attachment system comprises legs (700) extending transversely and/or rearwards relative to the clipping part (71) of the section member.

Clause 15. The upholstery system according to clause, alone or in combination with one of clauses 2 to 4 or 6 to 14, wherein each attachment system (5) comprises, on either side of the body (7) forming the anchoring part (70) and the clipping part (71), a spherical male portion (8) and an elastically deformable female portion (9) complementary to the spherical male part, the at least one ball joint (6) being formed by snap-fitting a female portion (9) of an attachment system (5) of the series, with a spherical male portion (8) of a consecutive attachment system (5) of the series.

Clause 16. A motor vehicle seat comprising a seating portion and a backrest, and wherein the backrest comprises an upholstery system (1) according to one of clauses 1 to 15.

Clause 17. The method for manufacturing an upholstery system (1) according to one of clauses 1 to 15, comprising:
the overmolding of the foam lining (2) onto the at least one series of attachment systems (5) which are connected by at least one ball joint (6),
the attachment of the at least one covering to the attachment systems (5) of the series which are received as inserts in the foam lining (2).

Clause 18. The method according to clause 17 for obtaining an upholstery system according to clause 8 for which the female parts of the attachment systems (5) of the series are extended in the form of at least one continuous groove (G) extending along the path of the series of attachment systems and wherein the overmolding comprises:
positioning the attachment systems (5) of the series in part of a mold of a die, as well as positioning a flexible closure member (10), forming part of the die, which extends continuously along the female parts of the attachment systems to close them off,
closing the mold and injecting a plastic foam so as to obtain a molded product by overmolding the attachment systems (5) with the plastic foam,
removing the closure member (10) from the molded product to expose the continuous groove (G) extending along the path of the series of attachment systems (5).

The invention claimed is:

1. An upholstery system for a vehicle seat, comprising:
a foam lining, comprising a front face adapted to receive an occupant and a rear face,
at least one covering which covers the front face and/or the rear face of the foam lining, and
at least one series of attachment systems, which are received as inserts in the foam lining, the attachment systems of the at least one series being interconnected by at least one ball joint, and wherein the attachment systems are configured to ensure the attachment of the at least one covering.

2. The upholstery system of claim 1, wherein the at least one covering comprises a flexible covering which covers the front face intended to receive the occupant, and a rigid part which covers the rear face of the foam lining, and wherein the attachment systems are configured to ensure the attachment of the flexible covering and of the rigid part onto the foam lining.

3. The upholstery system of claim 2, wherein the attachment systems each comprise a body forming an anchoring part embedded in the foam lining, and a clipping part configured to ensure the attachment of the flexible covering and of the rigid part by means of at least one first clip integral with the flexible covering and at least one second clip integral with the rigid part.

4. The upholstery system of claim 3, wherein the flexible covering is made integral with the first clip by a seam and/or the rigid part is made integral with the second clip by a seam.

5. The upholstery system of claim 3, wherein the clipping part of each attachment system comprises a concave female attachment part, receiving the at least one first clip and the at least one second clip, both in the form of male parts.

6. The upholstery system of claim 5, wherein the female parts of the attachment systems of the series are extended in the form of at least one continuous groove extending along the path of the series of attachment systems, the at least one groove being formed by the alternation of hollow sections of the female parts of the attachment systems, and at least one groove in the foam lining which extends the hollow sections of the female parts between the bodies of two consecutive attachment systems of the series.

7. The upholstery system of claim 6, wherein the foam lining comprises side faces and an upper face which are arranged between the front face and rear face of the foam lining, the continuous groove extending along the side faces and the upper face.

8. The upholstery system of claim 3, wherein the anchoring part and the clipping part of each attachment system are composed of a section member.

9. The upholstery system of claim 8, wherein the clipping part of the section member forms the female part of U-shaped cross-section, comprising a first leg, a second leg, and a third leg connecting the first leg and the second leg, the third leg forming the bottom of the female part, the female part of U-shaped cross-section simultaneously receiving a pair of clips consisting of at least one first clip and at least one second clip.

10. The upholstery system of claim 9, wherein the section member comprises a hooking rib projecting from the third leg, internal to the U-shaped cross-section, the hooking rib comprising a base extending from the third leg and terminated by a widened part, the widened part forming together with the base a first shoulder facing the first leg and a second shoulder facing the second leg, and wherein the at least one first clip of the pair of clips is locked in the female part between the first leg and the first shoulder, and the at least one second clip of the pair of clips is locked in the female part between the second leg and the second shoulder.

11. The upholstery system of claim 10, wherein:
the first clip is a section member integral with the at least one covering, the section member comprising a section comprising a leg, inserted in parallel along the first leg, terminated by a hook configured to engage with the first shoulder, and
the second clip is a section member integral with the rigid part, the section member comprising a section comprising a leg, inserted in parallel along the second leg, terminated by a hook configured to engage with the second shoulder.

12. The upholstery system of claim 8, wherein the anchoring part of the section member of each attachment system comprises legs extending transversely and/or rearwards relative to the clipping part of the section member.

13. The upholstery system of claim 3, wherein each attachment system comprises, on either side of the body forming the anchoring part and the clipping part, a spherical male portion and an elastically deformable female portion complementary to the spherical male portion, the at least one ball joint being formed by snap-fitting a female portion of an attachment system of the series with the spherical male portion of a consecutive attachment system of the series.

14. The upholstery system of claim 1, wherein the at least one covering comprises a panel which covers the rear face of the foam lining.

15. The upholstery system of claim 1, wherein the at least one series of attachment systems follows a non-rectilinear path along a contour of the foam lining, the non-rectilinear path being made possible by the at least one ball joint.

16. A motor vehicle seat comprising a seating portion and a backrest, and wherein the backrest comprises an upholstery system according to claim 1.

17. A method for manufacturing an upholstery system according to claim 1, comprising:
    overmolding of the foam lining onto the at least one series of attachment systems which are connected by at least one ball joint,
    the attachment of the at least one covering to the attachment systems of the series which are received as inserts in the foam lining.

18. A method for manufacturing an upholstery system according to claim 6, comprising:
    overmolding of the foam lining onto the at least one series of attachment systems which are connected by at least one ball joint,
    the attachment of the at least one covering to the attachment systems of the series which are received as inserts in the foam lining.

19. The method of claim 18 for which the female parts of the attachment systems of the series are extended in the form of at least one continuous groove extending along the path of the series of attachment systems and wherein the overmolding comprises:
    positioning the attachment systems of the series in part of a mold of a die, as well as positioning a flexible closure member, forming part of the die, which extends continuously along the female parts of the attachment systems to close them off,
    closing the mold and injecting a plastic foam so as to obtain a molded product by overmolding the attachment systems with the plastic foam,
    removing the closure member from the molded product to expose the continuous groove extending along the path of the series of attachment systems.

20. An upholstery system for a vehicle seat, comprising:
    a foam lining, comprising a front face adapted to receive an occupant and a rear face,
    at least one covering which covers the front face and/or the rear face of the foam lining, and
    at least one series of attachment systems, which are received as inserts in the foam lining, the attachment systems of the series each being interconnected by at least one ball joint having at least three degrees of freedom, and wherein the attachment systems are configured to ensure the attachment of the at least one covering, said at least one ball joint being configured to orient the attachment systems in the foam lining and along a non-rectilinear path which varies in any of the at least three degrees of freedom.

* * * * *